(12) United States Patent
Jitaru et al.

(10) Patent No.: US 11,996,785 B1
(45) Date of Patent: May 28, 2024

(54) HIGH EFFICIENCY AC-DC CONVERTER

(71) Applicant: Rompower Technology Holdings, LLC, Milford, DE (US)

(72) Inventors: Ionel Jitaru, Tucson, AZ (US); Andrei Stefan Savu, Bucharest (RO); Lucian Budica, Bucharest (RO)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

(21) Appl. No.: 18/513,318

(22) Filed: Nov. 17, 2023

Related U.S. Application Data

(60) Provisional application No. 63/426,298, filed on Nov. 17, 2022.

(51) Int. Cl.
| | | |
|---|---|---|
| *H02M 7/06* | (2006.01) | |
| *H02M 1/14* | (2006.01) | |
| *H02M 1/42* | (2007.01) | |
| *H02M 7/217* | (2006.01) | |

(52) U.S. Cl.
CPC ........... *H02M 7/217* (2013.01); *H02M 1/143* (2013.01); *H02M 1/4216* (2013.01)

(58) Field of Classification Search
CPC ............ H02M 7/02; H02M 7/04; H02M 7/06; H02M 7/217; H02M 1/42; H02M 1/143; H02M 1/4216
See application file for complete search history.

(56) References Cited

U.S. PATENT DOCUMENTS

| | | | |
|---|---|---|---|
| 1,234,567 | A | 7/1917 | Quigley |
| 5,126,931 | A | 6/1992 | Jitaru |
| 5,231,563 | A | 7/1993 | Jitaru |
| 5,434,768 | A | 7/1995 | Jitaru et al. |
| 5,477,131 | A | 12/1995 | Gegner |
| 5,694,302 | A | 12/1997 | Faulk |
| 6,018,469 | A | 1/2000 | Poon |

(Continued)

FOREIGN PATENT DOCUMENTS

| | | |
|---|---|---|
| CN | 1182972 A | 5/1998 |
| CN | 2468221 Y | 12/2001 |

(Continued)

OTHER PUBLICATIONS

U.S. Appl. No. 14/274,598, filed Nov. 13, 2014, Davila et al., Entire Document.

(Continued)

*Primary Examiner* — Gary L Laxton
(74) *Attorney, Agent, or Firm* — Thomas W. Galvani, P.C.; Thomas W. Galvani

(57) ABSTRACT

A method of optimizing the efficiency of an AC-DC converter, wherein the energy extraction time from the AC line is increased and as result the size of the bulk capacitor can be decreased and in applications wherein the size of the bulk capacitor is maintained constant the ripple across the bulk capacitor is decreased. The methods presented also increase the power factor in AC-DC converters. Extending the energy extraction from the AC line also lowers the RMS current through the input bridge and the input bulk capacitor. The reduction of the ripple across the bulk capacitor also increases the efficiency of the DC-DC converter, increasing in this way the overall efficiency of the AC-DC converter.

18 Claims, 17 Drawing Sheets

(56) References Cited

U.S. PATENT DOCUMENTS

| | | | |
|---|---|---|---|
| 6,473,318 | B1 | 10/2002 | Qian et al. |
| 6,522,108 | B2 | 2/2003 | Prager et al. |
| 6,862,195 | B2 | 3/2005 | Jitaru |
| 7,009,850 | B2 | 3/2006 | Jitaru |
| 7,375,984 | B2 | 5/2008 | Keung |
| 7,408,793 | B2 | 8/2008 | Jitaru et al. |
| 7,450,402 | B2 | 11/2008 | Jitaru |
| 7,548,435 | B2 | 6/2009 | Mao |
| 7,869,237 | B1 | 1/2011 | Schutten et al. |
| 9,089,020 | B2 * | 7/2015 | Watanabe .............. H05B 45/10 |
| 9,136,757 | B2 | 9/2015 | Arisawa et al. |
| 9,391,506 | B2 | 7/2016 | Jeong et al. |
| 9,899,928 | B2 | 2/2018 | Handa et al. |
| 9,899,929 | B2 | 2/2018 | Jitaru et al. |
| 9,985,546 | B2 | 5/2018 | Jitaru |
| 10,050,545 | B2 | 8/2018 | Jitaru |
| 10,103,639 | B2 | 10/2018 | Jitaru et al. |
| 10,135,348 | B2 | 11/2018 | Hsiao et al. |
| 10,224,730 | B2 * | 3/2019 | Ohtake ................... H02M 7/06 |
| 10,291,140 | B2 | 5/2019 | Jitaru |
| 10,574,148 | B1 | 2/2020 | Jitaru |
| 10,651,748 | B2 | 5/2020 | Jitaru |
| 10,972,014 | B2 | 4/2021 | Jitaru |
| 11,277,073 | B2 | 3/2022 | Jitaru |
| 11,374,500 | B2 | 6/2022 | Jitaru |
| 2002/0001203 | A1 | 1/2002 | Jitaru |
| 2005/0190582 | A1 | 9/2005 | Jacobs |
| 2005/0226012 | A1 | 10/2005 | Jovanovic et al. |
| 2007/0230228 | A1 | 10/2007 | Mao |
| 2008/0037302 | A1 | 2/2008 | Yang |
| 2011/0057639 | A1 | 3/2011 | Chung et al. |
| 2012/0147629 | A1 | 6/2012 | Mao et al. |
| 2013/0083564 | A1 | 4/2013 | Bai et al. |
| 2014/0192562 | A1 * | 7/2014 | Cho ................... H02M 1/4258 363/21.12 |
| 2014/0313627 | A1 | 10/2014 | Li et al. |
| 2015/0055262 | A1 | 2/2015 | Lin |
| 2015/0171734 | A1 * | 6/2015 | Yu ....................... H02M 1/4208 363/45 |
| 2015/0303789 | A1 | 10/2015 | Feng et al. |
| 2017/0012547 | A1 | 1/2017 | Jitaru |
| 2017/0244332 | A1 | 8/2017 | Leong et al. |
| 2017/0251535 | A1 | 8/2017 | Huang et al. |
| 2018/0198374 | A1 | 7/2018 | Jitaru |
| 2018/0278169 | A1 | 9/2018 | Jitaru |
| 2019/0115845 | A1 | 4/2019 | Jitaru |
| 2020/0220465 | A1 | 7/2020 | Koo et al. |
| 2022/0399826 | A1 * | 12/2022 | Olsson .................. H02M 7/217 |

FOREIGN PATENT DOCUMENTS

| | | |
|---|---|---|
| CN | 201528275 U | 7/2010 |
| CN | 101047335 B | 12/2010 |
| CN | 104426344 A | 3/2015 |
| CN | 105048819 A | 11/2015 |
| CN | 205960954 U | 2/2017 |
| CN | 107078646 A | 8/2017 |
| CN | 107078646 A | 8/2017 |
| CN | 207766141 U | 8/2018 |
| EP | 0851566 A2 | 7/1998 |

OTHER PUBLICATIONS

U.S. Appl. No. 14/933,476, filed May 5, 2016, Davila, Entire Document.

U.S. Appl. No. 15/825,647, filed Oct. 19, 2021, Jitaru, Entire Document.

U.S. Appl. No. 62/571,594, filed Oct. 12, 2017.

Adbi, E., and Farzanehfard, H., New Zero Voltage Switching PWM Flyback Converter, IEEE—First Power Electronic & Drive Systems & Technologies Conference, pp. 196-200.

Henry Shu-Hung Chung, Hui and Wang; A Zero-Current-Switching PWM Flyback Converter with a Simple Auxiliary Switch; IEEE Transactions on Power Electronics, vol. 14, No. 2, Mar. 1999; pp. 329-342. (Year: 1999).

Power Integrations, Application Note AN-92 MinE-CAP Family, Design Guide, https://www.power.com/downloads/documents/an-92_mine-cap_family_design_guide.pdf?language=ja&_gl=1*1rndhin*_ga*MTE0NzkwNjgxNy4xNzAwMjUzNjAw*_ga_2CDVGJMVN5*MTcwMDI1MzYwMC4xLjAuMTcwMDI1MzYxMI40OC4wLjA. Access date: Nov. 17, 2023.

* cited by examiner $Vin = 90 Vac$ $Vin = 115 Vac$ $Vin = 230 Vac$

Pd=1.25W
2.08%

Pd=1.18W
1.9%

Pd=0.62W
1.03%

HIGH EFFICIENCY AC-DC CONVERTER

CROSS-REFERENCE TO RELATED APPLICATIONS

The application claims the benefit of U.S. Provisional Application No. 63/426,298, filed Nov. 17, 2022, which is hereby incorporated by reference in its entirety.

FIELD

The present specification relates generally to electronic devices, and more particularly to power converters.

BACKGROUND

Flyback topology is one of the most used circuit topologies in the field of power conversion, especially in lower-to-medium power applications (such as AC-DC adapters, for example). The reason for such a high level of adoption of flyback topology is its simplicity and low cost of implementation, as well as the fact that the so-configured electrical circuitry can operate efficiently over a very large range of input voltages. In AC-DC adapter applications with powers under about 70 W, in order to gain a capability to nearly universal applications, the circuits formatted according to flyback topology are used to operate after an output from a simple bridge rectifier, while the alternating-current input voltage ranges from 90Vac to 264Vac (conventionally, a rectifier is an electrical device that converts alternating current to direct current, which flows in only one direction).

To meet all the AC-voltage standards for different countries, when placed at the output of the rectifier, the flyback converter has to be able to operate efficiently with an approximate DC input voltage ranging from 79Vdc to 375Vdc, due to the ripple on the bulk capacitor, which is a range in which the ratio of the upper input voltage limit to the lower voltage limit is almost three to one. Additionally, the new standards for power delivery require that the adapters provide a voltage output ranging from 3.3V to 20V (with the ratio of the upper voltage limit to the lower voltage limit of four to one, as far as the output voltage is concerned). Most of the forward-derived topologies (such as, for example, half-bridge topology, two-transistor forward topology, full bridge topology, and others) are not able to operate efficiently over such large input and output voltage ranges provided by the transfer function of the flyback topology-based circuit.

The trend for miniaturization of portable equipment (for example, portable computing devices such as laptops and tablets) extends this demand even further, such that AC-DC adapters have also become subject to these requirements. Presently, most laptops and tablets require, for operation, power ranging from 30 W to 65 W. Due to the significant technological advancement in portable computing devices, the size of laptops and tablets has been significantly reduced, and yet the AC-DC adapters used to power such devices remain quite large (for example, dimensions of a typical adaptor for a small tablet device are about 3.3" by 1.8" by 1.3" or so). This has created pressures for size reduction of AC-DC adapters. The ability to reduce the size of the adapters while maintaining the convection-based cooling methodology used today requires some significant improvement in efficiency of the adapters as well as a decrease of size of the magnetic and capacitive storage elements.

Over the years, the efficiency of the AC-DC adapters has increased from about 70% to about 89-90% (in recent products such as the Apple 30 W adapter, for example). This has been mostly due to the significant progress in semiconductor industry and a better understanding of magnetic technology.

The flyback topology, however, possesses several drawbacks that limit its efficiency of operation. In most applications, the flyback-topology circuitry operates in a discontinuous mode. In a discontinuous mode of operation, the magnetizing current is first built up from zero to a peak conducting, and after the main switch turns off, the magnetizing current flows into the secondary side winding and transfers the energy to the output capacitor until the value of the magnetizing current decreases to zero. This portion of the operation cycle is followed by a period of time, referred as "dead time", when no energy is stored in the transformer or transferred to the secondary. When the "dead time" is reduced to the transition time (which is the time interval during which the voltage across the main switch decays from the level it had when the magnetizing current flowed into the secondary winding to its lowest level, which occurs in the beginning of the "dead time"), this mode of operation is sometimes referred as a critical conduction mode of operation.

SUMMARY

In an embodiment, an AC-DC converter circuit includes a ground connection and an input AC voltage source having two terminals, said input AC voltage source having a positive peak and a negative peak and reaching zero amplitude in between the positive and negative peaks, which repeats for a large number of cycles. The AC-DC converter circuit includes an input bridge rectifier formed by a left branch and a right branch, each branch formed by two rectifier means in series, having a left branch node which is a common connection of the two rectifier means on the left branch, and having a right branch node which is the common connection of the two rectifier means on the right branch. The left branch and right branch are connected together at each end, defining an upper end bridge and a lower end bridge. The upper end bridge and the lower end bridge are connected to each terminal of the input AC voltage source. The left branch node is connected to the ground connection. A bulk capacitor is connected to the right branch node and the ground connection. A DC-DC converter has a positive input and a negative input. An input capacitor is connected to the positive and negative inputs, wherein the negative input is also connected to the ground connection. A control switch is connected in between the bulk capacitor to the terminal which is connected to the right branch node and to the positive input of the DC-DC converter. A first rectifier means is connected in between the upper end bridge and the positive input of the DC-DC converter, and a second rectifier means is connected in between the lower end bridge and the positive input of the DC-DC converter.

In embodiments, the bulk capacitor is formed by two totem pole capacitors in series, wherein the two totem pole capacitors are an upper capacitor and a bottom capacitor. The bottom capacitor is connected to the ground connection with a terminal that is not connected to the upper capacitor. A controlled current source is connected in parallel with the upper capacitor. In embodiments, the controlled current source is activated during a time when the control switch is off. In embodiments, the controlled current source is energized by the DC-DC converter. In embodiments, the controlled current source is energized by energy harvested from parasitic energy from the DC-DC converter. In embodiments, a controlled current source is connected in parallel with the bulk capacitor. In embodiments, the controlled current source is activated during a time when the control switch is off. In embodiments, the controlled current source is energized by the DC-DC converter. In embodiments, the controlled current source is energized by energy harvested from parasitic energy from the DC-DC converter.

In an embodiment, a method includes providing an AC-DC converter circuit. The AC-DC converter circuit includes a ground connection and an input AC voltage source having two terminals, said input AC voltage source having a positive peak and a negative peak and reaching zero amplitude in between the positive and negative peaks, which repeats for a large number of cycles. The AC-DC converter circuit includes an input bridge rectifier formed by a left branch and a right branch, each branch formed by two rectifier means in series, having a left branch node which is a common connection of the two rectifier means on the left branch, and having a right branch node which is the common connection of the two rectifier means on the right branch. The left branch and right branch are connected together at each end, defining an upper end bridge and a lower end bridge. The upper end bridge and the lower end bridge are connected to each terminal of the input AC voltage source. The left branch node is connected to the ground connection. A bulk capacitor is connected to the right branch node and the ground connection. A DC-DC converter has a positive input and a negative input. An input capacitor is connected to the positive and negative inputs, wherein the negative input is also connected to the ground connection. A control switch is connected in between the bulk capacitor to the terminal which is connected to the right branch node and to the positive input of the DC-DC converter. A first rectifier means is connected in between the upper end bridge and the positive input of the DC-DC converter, and a second rectifier means is connected in between the lower end bridge and the positive input of the DC-DC converter.

In embodiments, the method includes wherein the control switch is turned off at a time when the input AC voltage source reaches its positive and negative peak and turns on after a determined time period. In embodiments, the method includes wherein the determined time period is tailored so that AC-DC converter efficiency is maximized. In embodiments, the method includes the bulk capacitor is formed by two totem pole capacitors in series, wherein the two totem pole capacitors are an upper capacitor and a bottom capacitor. The bottom capacitor is connected to the ground connection with a terminal that is not connected to the upper capacitor. A controlled current source is connected in parallel with the upper capacitor. In embodiments, the method includes wherein the controlled current source is activated during a time when the control switch is off. In embodiments, the method includes wherein the control switch is turned off at a time when the input AC voltage source reaches its positive and negative peak and turns on after a determined time period. In embodiments, the method includes wherein the determined time period is tailored so that AC-DC converter efficiency is maximized. In embodiments, the method includes wherein a controlled current source is connected in parallel with the bulk capacitor. In embodiments, the method includes wherein the controlled current source is activated during a time when the control switch is off.

BRIEF DESCRIPTION OF THE DRAWINGS

Referring to the drawings.

DETAILED DESCRIPTION

Figure 1:
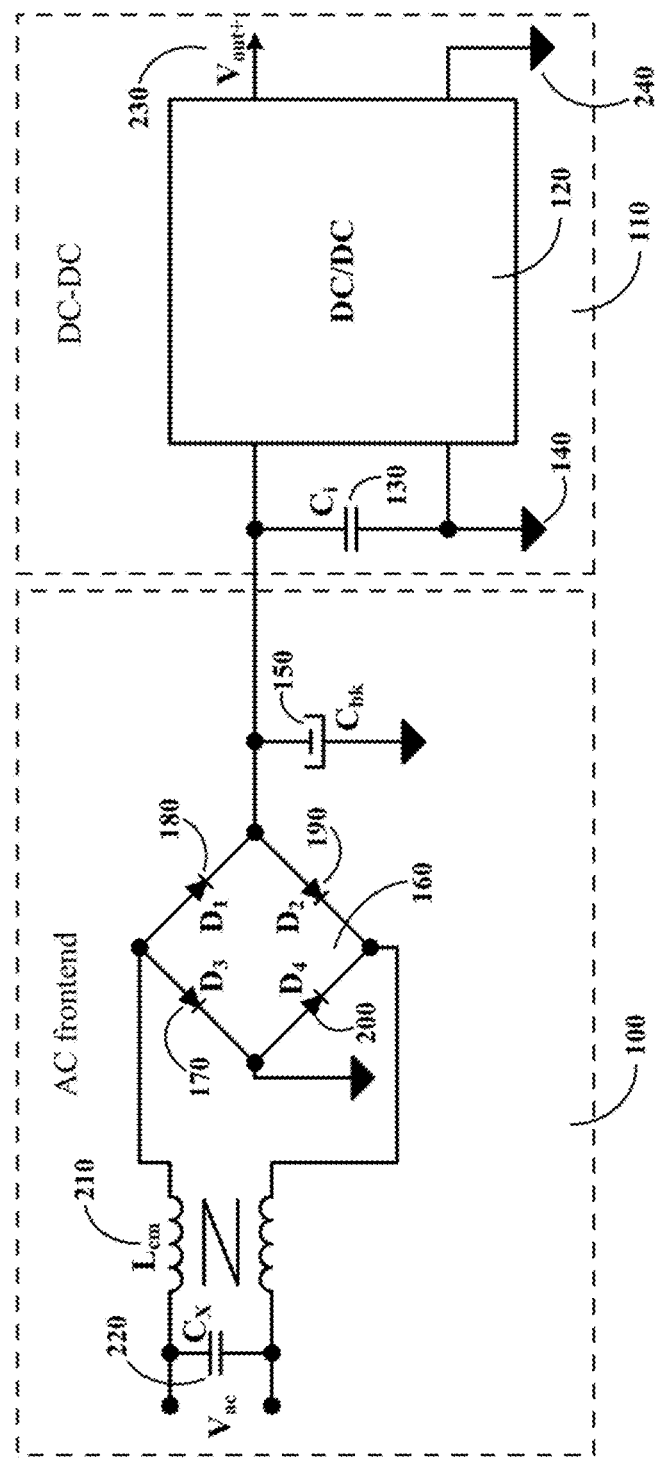
FIG. 1 depicts an AC-DC converter formed by two building blocks, the AC frontend, and a DC-DC Converter.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification.

Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

MinE-CAP Family Prior Art

Figure 8:
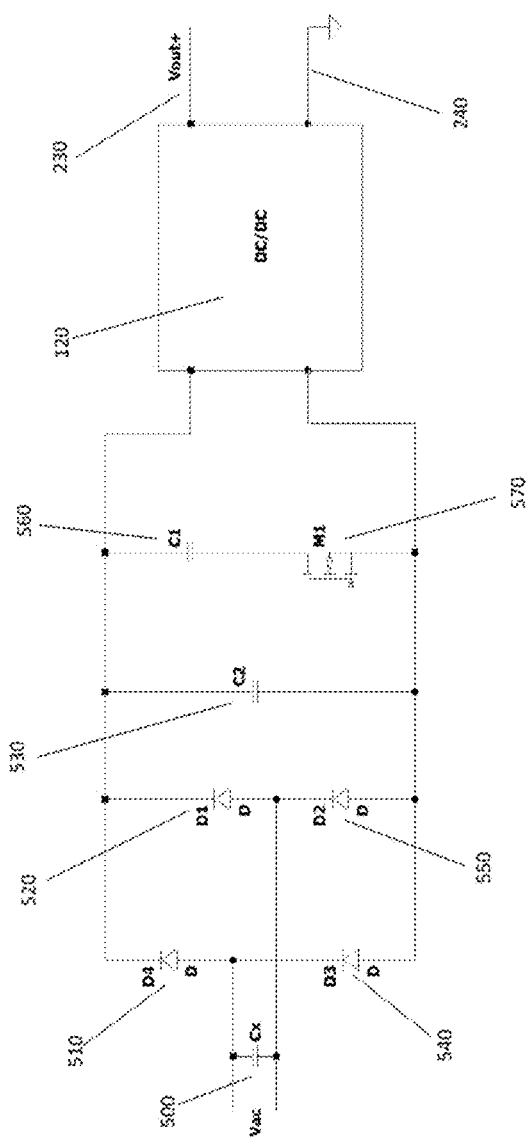
FIG. 8 presents a prior art circuit named MinE-CAP family.

One prior art solution to improve the performances at low line (90Vac-115Vac) is presented by Power Integrations Inc. (www.power.com) in the AN-92, application notes, MinE-CAP family. The presented solution can be used for AC front end rectification in offline power supplies with the full 90Vac-264Vac range especially low line (90Vac-115Vac). The typical problem for 90Vac operation is the low efficiency caused by the losses in the DC/DC converter operation at low input DC voltage. For this reason, a high value electrolytic capacitor is desired with the penalty of a larger size. With a high value electrolytic the voltage ripple of the DC/DC converter is lower and as a result the DC/DC converter efficiency is higher. This concept is depicted in FIG. 8.

Diodes 510, 520, 540, 550 form the bridge rectifier. The typical bulk capacitor is split in between two separate capacitors, a high voltage one, 530 and a low voltage one, 560. The low voltage capacitor 560 is connected in series with a high voltage switch 570. At 90Vac operation the switch, 570 is closed. Above 100Vac input voltage the high voltage switch 570 is opened to disconnect the low voltage capacitor. Efficiency at 90Vac operation is increased by a higher effective capacitance connected to the DC/DC input which reduces the voltage ripple. The advantage of this solution is that a higher capacitance is obtained at 90Vac operation without the size penalty. The disadvantage is that a higher effective capacitance will increase the RMS current at the converters input which means a larger power dissipation in the bridge rectifier. Efficiency at 90Vac operation is increased by a higher effective capacitance connected to the DC/DC input which reduces the voltage ripple. One advantage of this solution is that a higher capacitance is obtained at 90Vac operation without the size penalty. One disadvantage is that a higher effective capacitance will increase the RMS current at the converters input.

DC Link Prior Art

Figure 9:
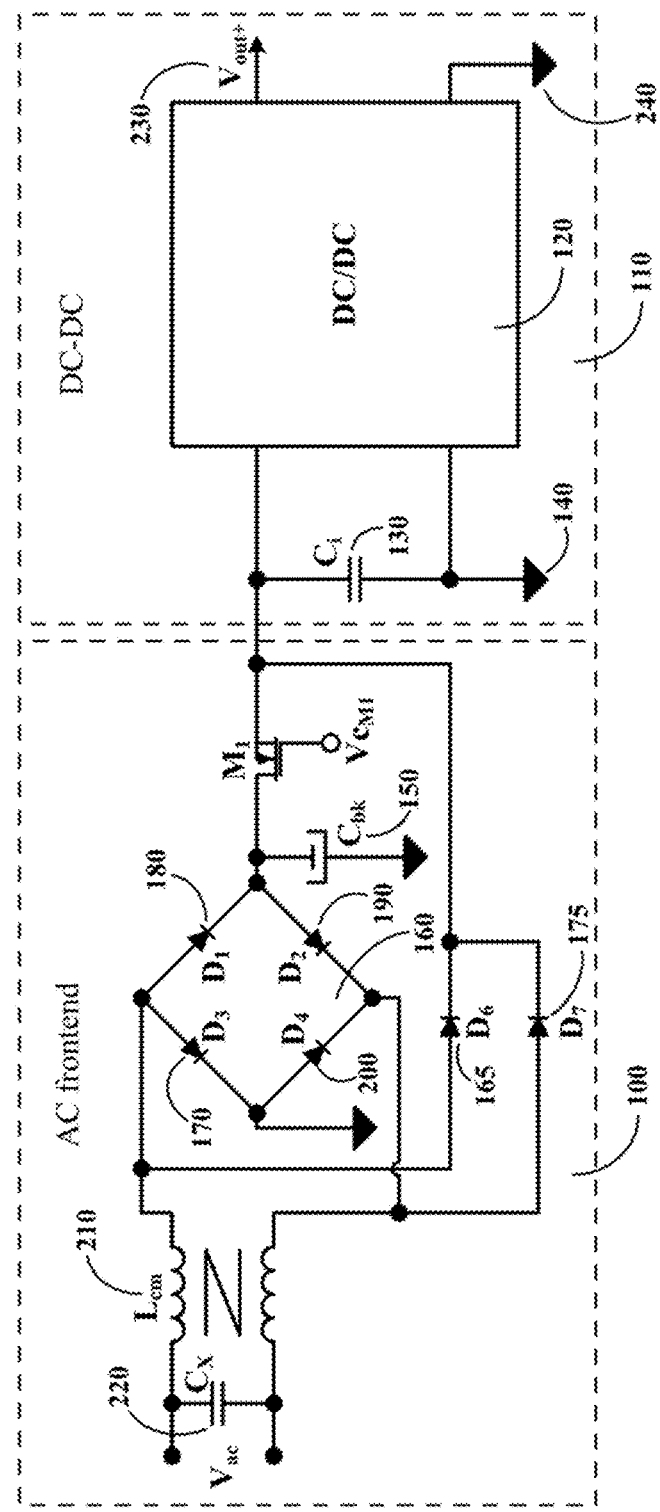
FIG. 9 presents the prior art circuit named "DC Link Solution"

This solution was presented at the PCIM Conference in 2012 by Bogdan Bucheru, Marco Davila and Ionel "Dan" Jitaru, the paper titled "Increasing Power Density of Adapters by using DC Link Chopper". The concept is presented in FIG. 9. In FIG. 9 is presented an AC-DC converter containing an EMI filter formed by X cap, 220, and common mode-differential filter, 210, a bridge rectifier 160, formed by four diodes, D3, 170, D1, 180, D2, 190, and D4, 200. and a bulk capacitor Cbk, 150. In addition to that the AC frontend, 100, contained two additional diodes, D6 and D7. In the DC-DC converter there is small input capacitor, Ci, 130 formed usually by one or several ceramic capacitors in parallel.

Figure 11:
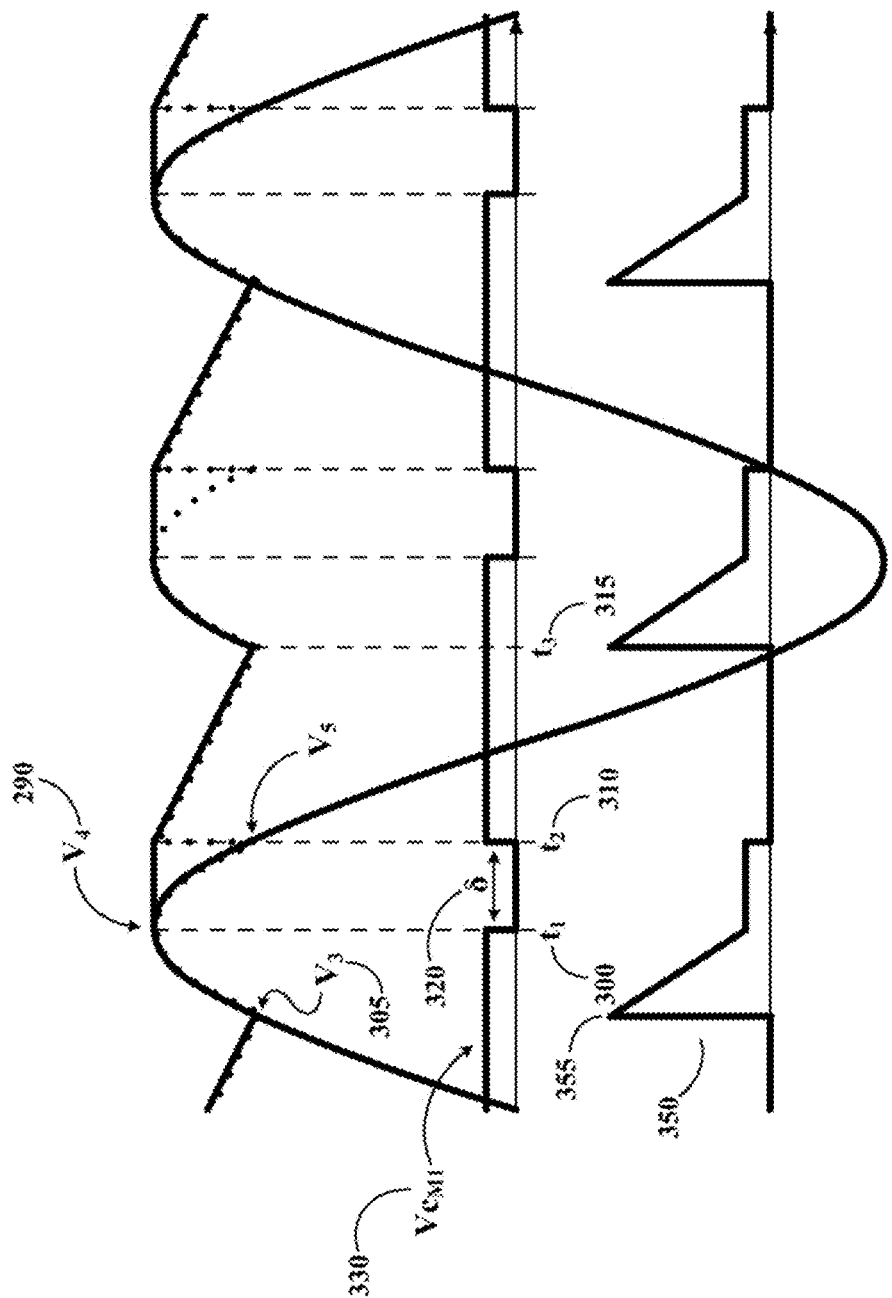
FIG. 11 presents some of the waveforms of the circuit from FIG. 9.

An element of this AC-DC converter is the additional switch M1. Some of the waveforms associated with this concept are depicted in FIG. 11.

M1 is controlled by a controlled signal VcM1. The M1 switch is on until the AC voltage sources reaches its peak at t1. At t1 the switch M1 turns off. At t1 the voltage across Cbk, 150, reaches its peak at V4, 290. After a delay time δ the M1 is turned on again at t2. The location of t1 is not as significant, though ideally the M1 should turn on close to the peak voltage of the AC line. The location of t2 is more significant and that leads to the first embodiment of this specification. In between t1 and t2 the DC-DC converter, 120 gets its energy via D6, 165 and D7, 175 and the input voltage for the DC-DC Converter, 120, is the AC line and decreases following the AC line until t2. At that time M1 turns on and the voltage at the input of the DC-DC Converter jumps up to V4 level, 290. At t2 the Clk, 150 is again connected across the input of DC-DC Converter 120. After t2 the input current of the DC-DC Converter will discharge the bulk capacitor until the rectified AC input voltage exceed the voltage across the bulk capacitor and the AC line will start charging the bulk capacitor starting at t3. The current from the AC line, 350, will have a fast jump to the peak input current 355 after which will discharge until t1 and further in between t1 to t2 the input current from the line reaches the same level as the input current demanded by the DC-DC Converter. The result of this operation the effective power factor is improved and as a result the RMS current via the diodes in the bridge rectifier is decreased and the power dissipation in the bridge rectifier is decreased as well.

Embodiments

Figure 2:
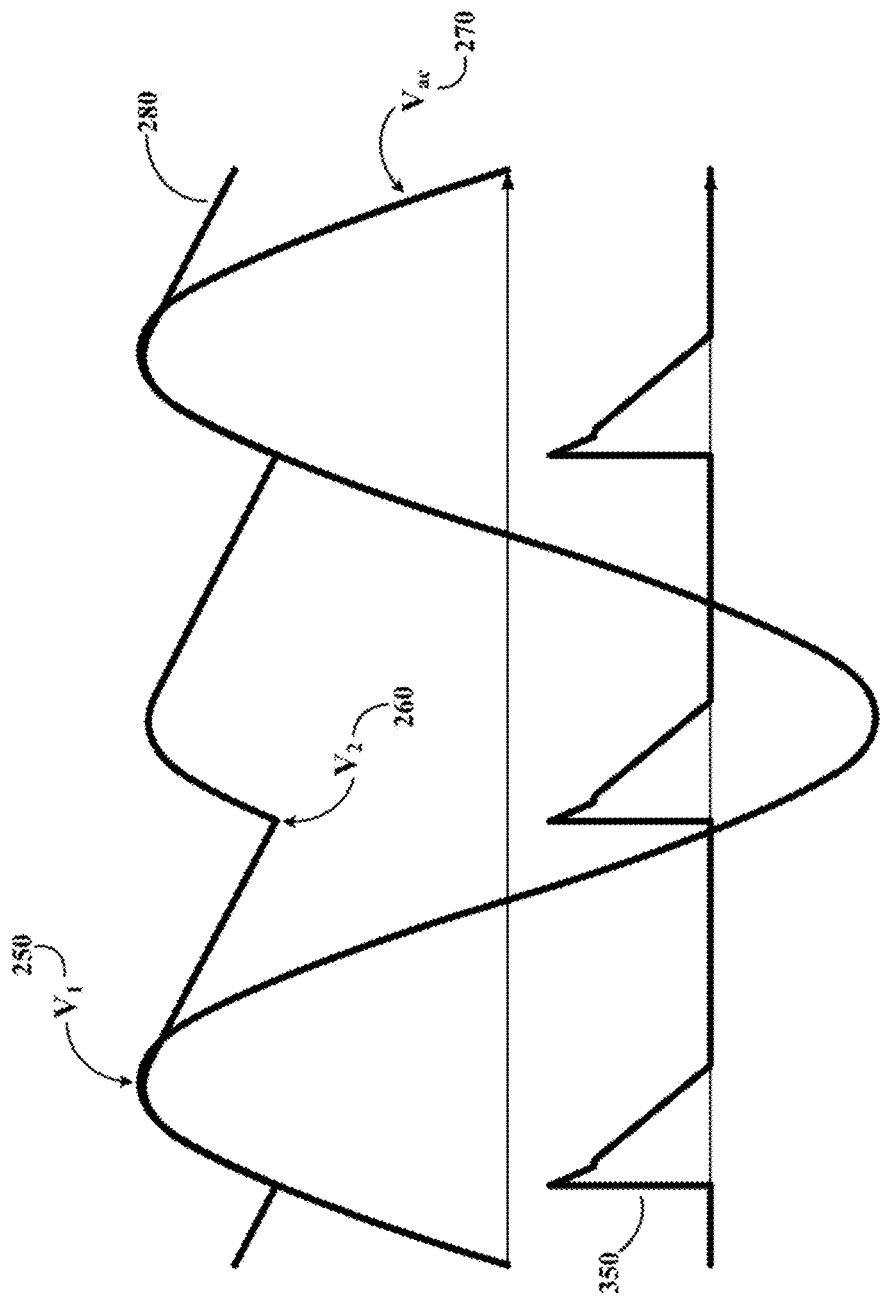
FIG. 2 depicts the AC input voltage waveform together with the voltage across the input bulk capacitor and the input current.

An AC-DC adapter includes two stages. The first stage contains the EMI filter, and the rectifier means, which rectifies the line voltage and charges a bulk capacitor. The bulk capacitor provides the energy for the second stage which is a DC-DC converter, in most of the application a flyback converter. At low input voltage, 90Vac, and 65 W output power and 100 uF bulk capacitor the voltage across the bulk capacitor varies in between a peak of 127Vdc a low level of 79V dc. The second stage of an AC-DC adapter is the DC-DC Converter, wherein in most of the application the flyback topology is used. FIG. 1 presents an AC-DC adapter formed by an AC frontend, 100, followed by a DC-DC converter stage, 110, to regulate the output voltage even when the voltage on the bulk capacitor reaches the low level of 79V. At high line for 264Vac, the peak voltage across the bulk capacitor reaches 375V. In conclusion the flyback converter has to be capable to provide the full power of 65 W and regulate an output voltage in between 3.3V and 20V when the DC input range varies in between 79Vdc to 375Vdc. FIG. 2 depicts the AC input voltage (270) and the voltage across the bulk capacitor (280). The voltage V1 (250) represents the peak of the voltage across the bulk capacitor and the voltage V2 (260) represents the valley across the voltage across bulk capacitor which reaches 79V for an input voltage of 90Vac. The current through the diodes of the bridge rectifier, 160, is depicted by the trace 350, from FIG. 2.

Figure 3:
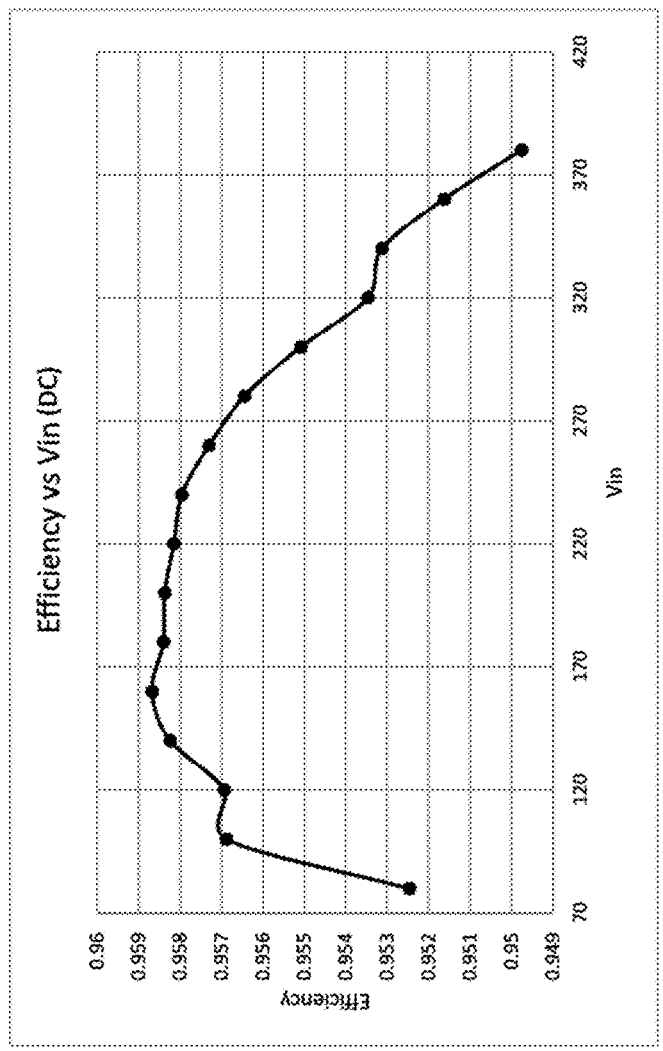
FIG. 3 presents the efficiency of the DC-DC converter versus DC input voltage.

FIG. 3 presents the efficiency of a DC-DC Converter using a flyback topology. At low input voltage the efficiency drops very quickly under 100Vdc. In between 100Vdc and 80Vdc the DC-DC converter is losing 0.5%.

Figure 4:
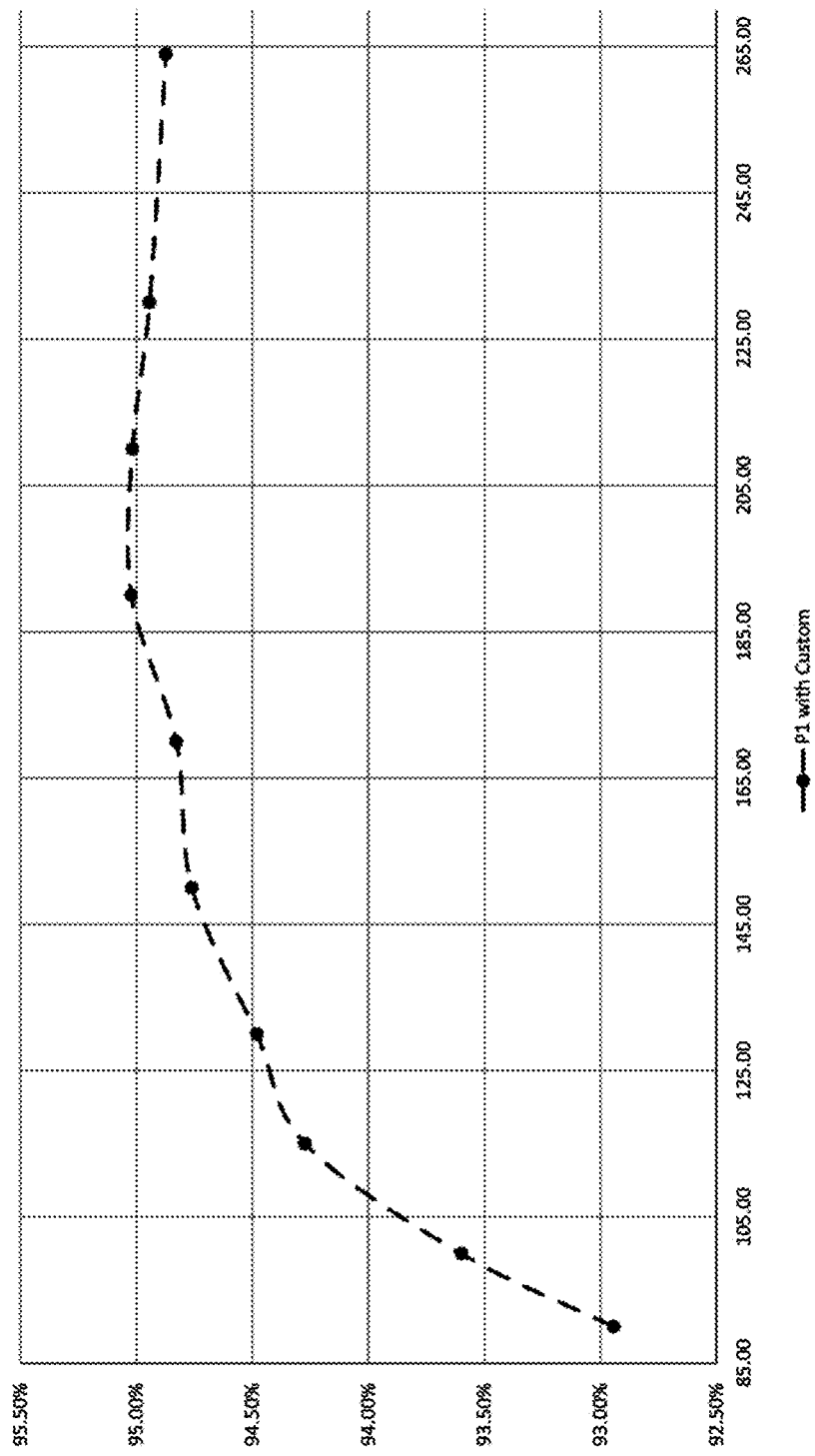
FIG. 4 presents the efficiency of the AC-DC converter versus AC input voltage.

FIG. 4 presents the efficiency of the AC-DC converter which also includes the AC front end. From FIGS. 3 and 4 is concluded that we are losing in the front end at low line, 90Vac, 1.5% to 2% in efficiency.

Figure 5:
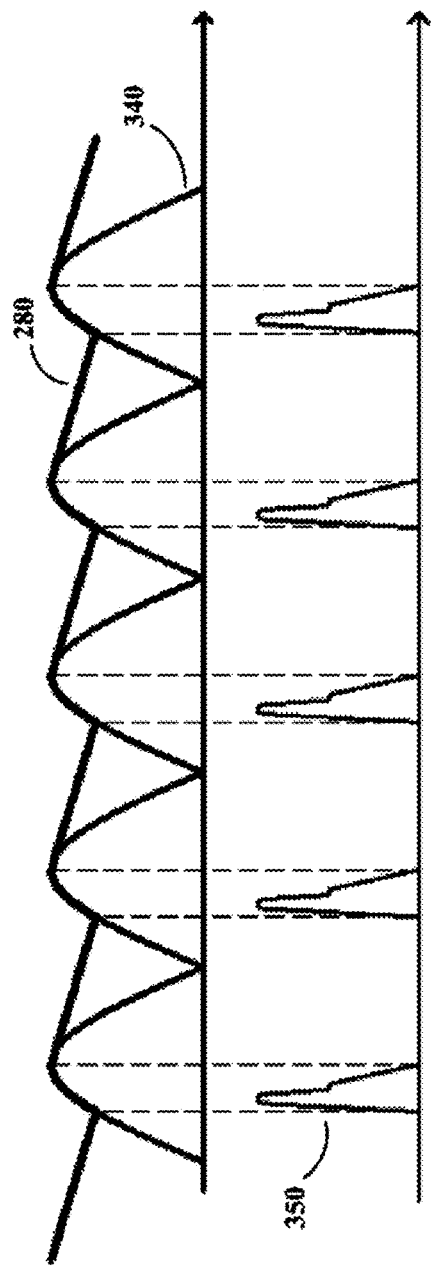
FIG. 5 presents the waveforms on the rectified AC input voltage source, the voltage across the bulk capacitor and the input current.
Figure 6A:
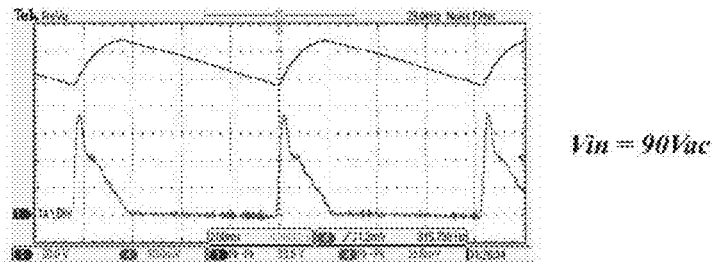
FIG. 6A presents experimental waveforms of the voltage across the bulk capacitor and the input current for Vin=90Vac.
Figure 6B:
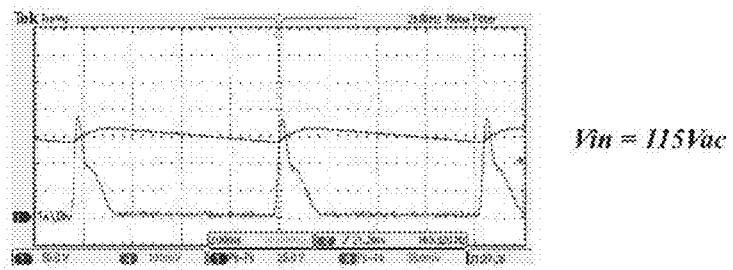
FIG. 6B presents experimental waveforms of the voltage across the bulk capacitor and the input current for Vin=115Vac.
Figure 6C:
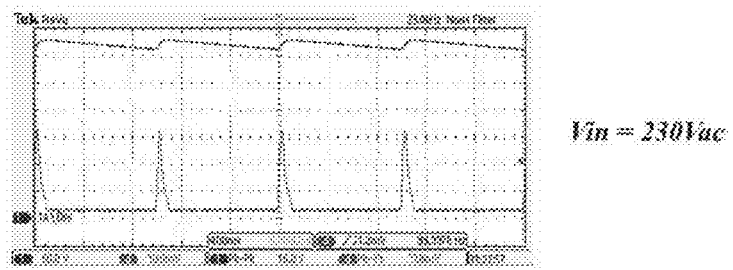
FIG. 6C presents experimental waveforms of the voltage across the bulk capacitor and the input current for Vin=230Vac.

FIG. 5 depicts the rectified input voltage, 340, and the current, 350, through the bridge rectifiers shown in FIG. 1 at 160. The shape of the input current is highly dependent of the input voltage. The current through the input bridge has an initial spike followed by a triangular shaped current decaying towards zero. FIG. 6A, FIG. 6B, and FIG. 6C present the voltage across the bulk capacitor and the current through input bridge for Vin=90Vac, Vin=115Vac and Vin=230Vac.

Figure 7A:
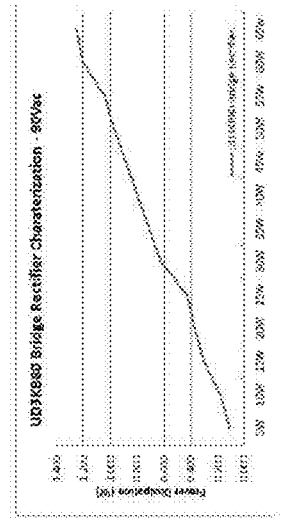
FIG. 7A presents the AC front end wherein the bridge is implemented with diodes.
Figure 7B:
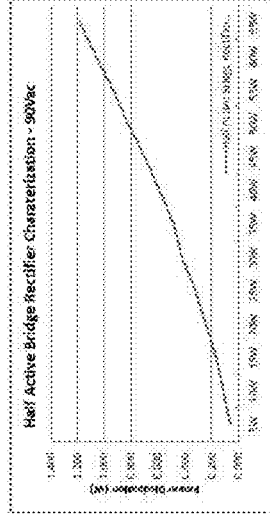
FIG. 7B presents the AC front end wherein the bridge is implemented with two diodes and two synchronous rectifiers.
Figure 7C:
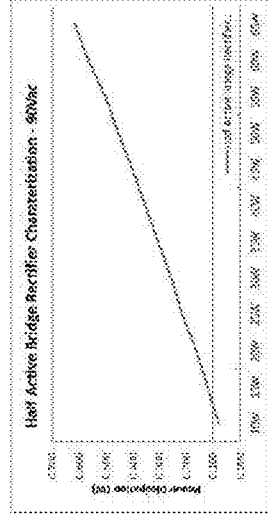
FIG. 7C presents the AC front end wherein the bridge is implemented with two diodes and two synchronous rectifiers and followed by a PFC circuit.
Figure 7D:
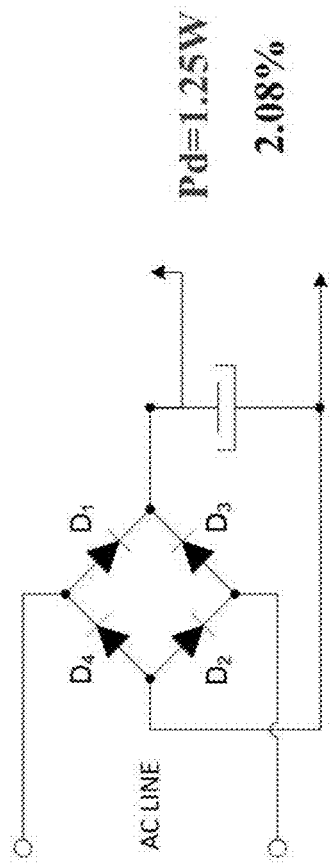
FIG. 7D presents the power dissipated in the input bridge using the circuit from FIG. 7A.
Figure 7E:
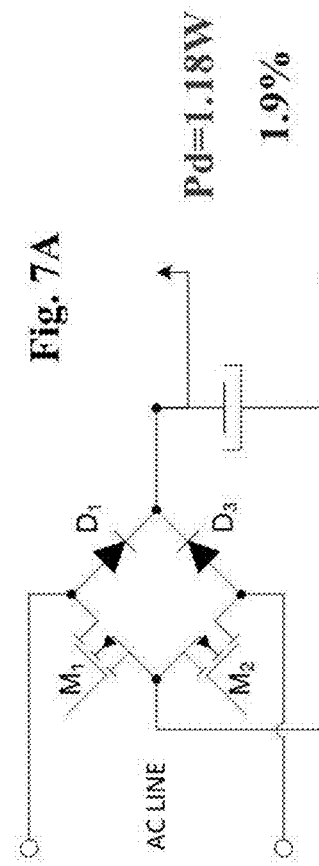
FIG. 7E presents the power dissipated in the input bridge using the circuit from FIG. 7B.
Figure 7F:
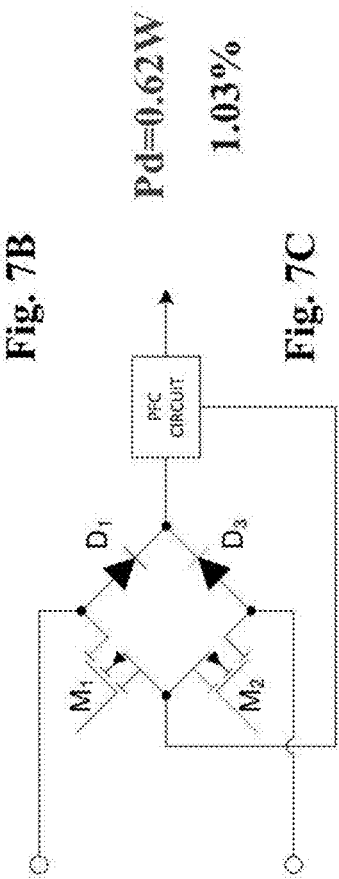
FIG. 7F presents the power dissipated in the input bridge using the circuit from FIG. 7C.

FIG. 7A presents a conventional input bridge using diodes. The power dissipated in the bridge rectifier is 1.25 W which represents 2.08%. FIG. 7B presents an input bridge wherein two of the diodes are replaced by two low Ron mosfets. In this case the power dissipated in the bridge is a little lower at 1.18 W, which represents 1.9% of the output power. As expected, the voltage drop on the mosfets by design is chosen to be lower than the voltage drops on the diodes. In FIG. 7C the bridge rectifier is followed by a power factor circuit. In this case the power dissipated on the bridge rectifier is 0.62 W, which represents 1.03% of the putout power. The presence of the PFC decreases the RMS current through the input bridge. In conclusion, to decrease the power dissipation in the input bridge, the RMS current through the rectifier means has to be decreased. For a given power level the improvement of the power factor, which reduces the RMS current it is a very efficient solution in improving the efficiency of the AC front end. FIGS. 7D, 7E and 7F present the power dissipation in input bridge versus the output power in the configurations depicted in FIG. 7A, FIG. 7B and FIG. 7C.

The following paragraphs describe several non-limiting embodiments of this specification.

Embodiment #1

When $\delta$ is increasing V5 will decrease its level and as a result the voltage at the input of DC-DC Converter, 120 will decrease negatively impacting the efficiency. At the same time an increase in $\delta$ will increase the time the energy for the DC-DC Converter is provided directly from the AC line. Increasing $\delta$ in this way, the effective power factor and reduction of the RMS through the bridge rectifier which will increase the overall efficiency of the AC front end and even is the DC_DC Converter efficiency may decrease due to a lower V5. In the first embodiment the $\delta$ shall be increased until the efficiency of the entire AC-DC converter reaches its peak level. This can be done experimentally, and the data can be used to derive a look up table wherein the $\delta$ is chosen to maximize the efficiency at every input voltage for the entire AC-DC Converter which includes the AC frontend and the DC-DC Converter.

Embodiment #2

The decoupling mosfet M1, is activated by the turn on and off by the control signal 330, starting from the low input voltage 90Vac until a certain input voltage, for example 115Vac. The input voltage level at which the M1 is activated is another parameter which is chosen to maximize the efficiency versus input voltage. At higher input voltage, turning on and off the M1 may not be as efficient and then it is turned on and kept on. The switching losses by turning on and off are negligible but will impact the efficiency. The switching losses at turn off are very low because M1 turns on with almost zero voltage across it. The turn on losses are higher and depend on the value of $\delta$. A look-up table to establish the optimum input voltage when M1 will be kept on is helpful for the optimization of the entire AC-DC converter.

Due to the low frequency of operation the turn on and off of M1 can be done using a floating low voltage source, formed by several turns from the transformer of the DC-DC converter and an optocoupler.

Embodiment #3

Figure 10:
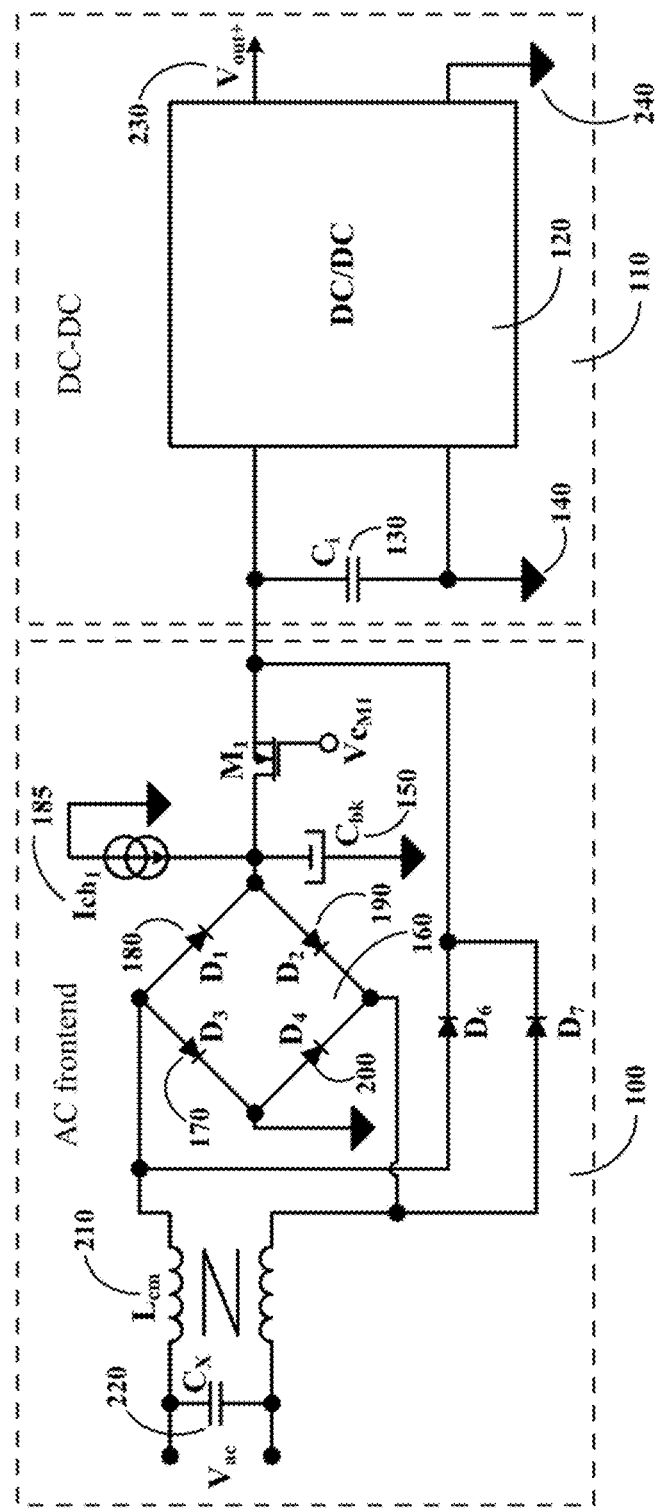
FIG. 10 presents one of the embodiments of this specification.
Figure 15:
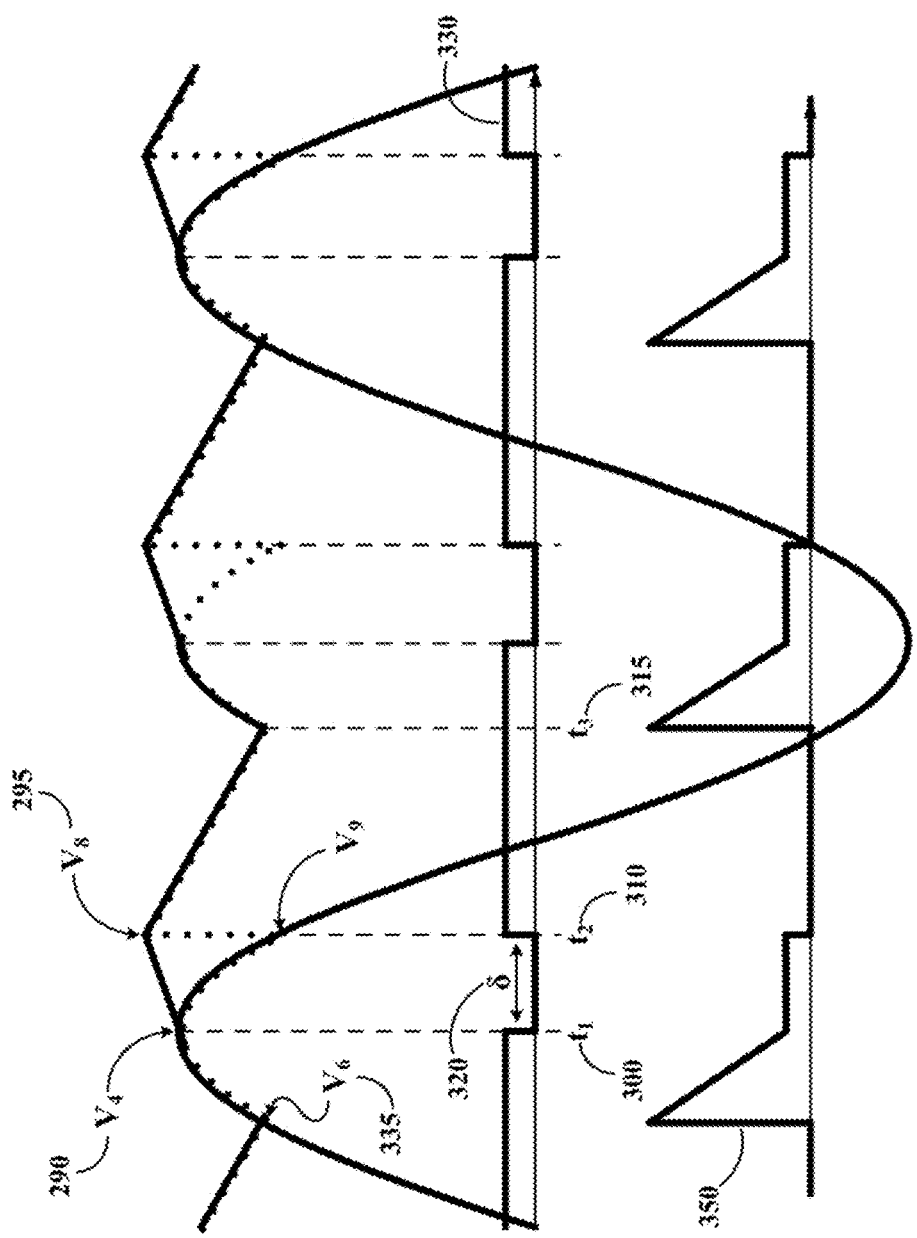
FIG. 15 presents some of the waveforms in one of the embodiments of this specification.

Another solution in further improving the efficiency of the circuit depicted in FIG. 10 is to inject energy into the bulk capacitor in between t1 and t2. In between t1 and t2 no energy is extracted from the bulk capacitor Cbk. As a result, even a smaller current injected between t1 and t2 will increase the voltage across Cbk as depicted in FIG. 10. FIG. 15 depicts some of the waveforms wherein such embodiment is implemented. At t1, a current source is activated as per FIG. 10, current source, Ich1, 185, which will change the Cbk from a voltage level, V4 to a voltage level V8, 295, as depicted in FIG. 15. At t2, when M1 is turned on, the voltage at the input of the DC-DC converter, 120, will jump to a higher level than the peak voltage of the AC line voltage, V4, 290. In this embodiment the level of the voltage across Cbk will reach a higher level, V8, 295. After t2, 310, the voltage across Cbk will start discharging by the input current of the DC-DC Converter. Because the voltage V8, 295, is higher than V4, 290, from the case wherein no current injection circuit is utilized, the intersection with the AC line will occur later at the time t3, 315 at a voltage level V6 335 larger than V3, 305 from FIG. 11. This mode of operation claimed in embodiment 3, has several advantages. A first advantage is that increases the voltage level V6, 335, from FIG. 15 which increases the min voltage at the input of the DC-DC Converter, 120, and as a result increases the efficiency of the DC-DC converter. In addition to that decreases the RMS current though the input bridge which increases the efficiency of the AC front end. In conclusion, the efficiency of the AC-DC converter is increased from both power processing sections, AC frontend and DC-DC Converter of the AC-DC converter.

Figure 12:
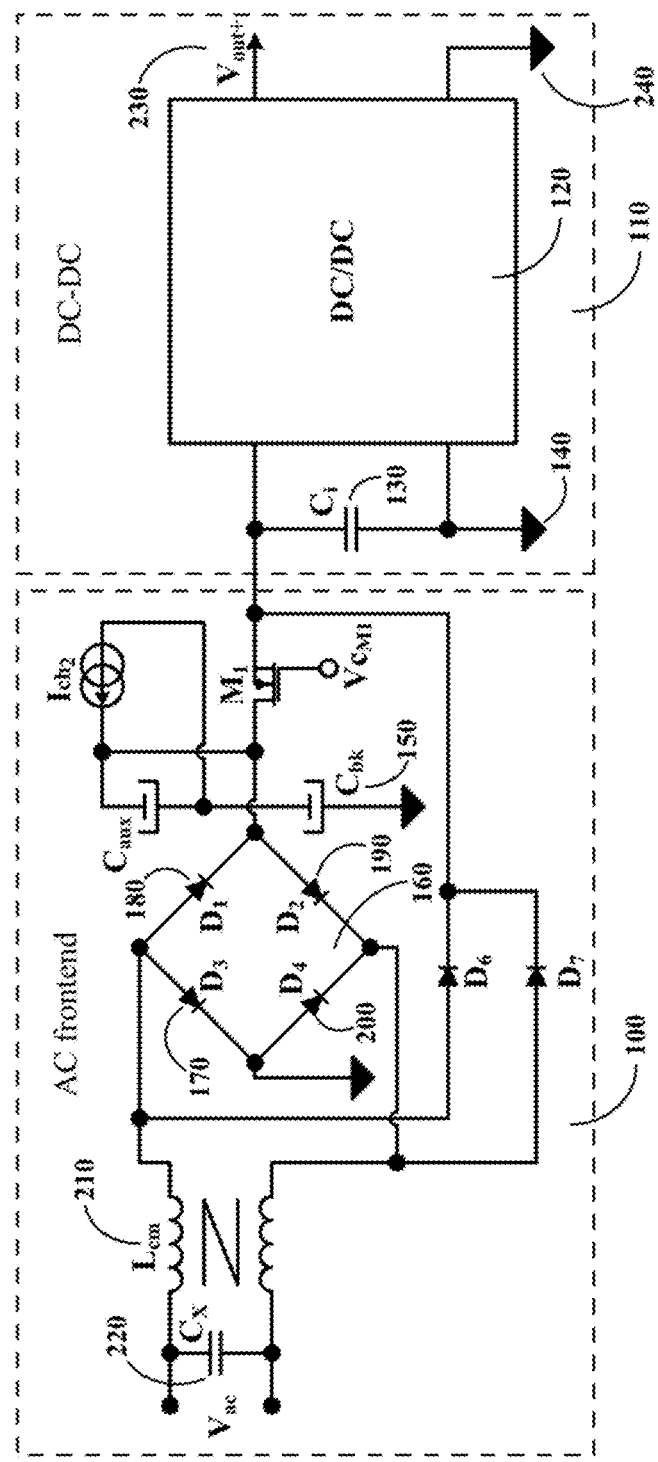
FIG. 12 presents another embodiment of this specification.

Such a current source as Ich1, 185, can be implemented in several ways. One way is to use a boost converter using rectified input voltage after the main bridge, 160. Another source is a second output of the DC-DC converter, though in this case the second output is a high voltage output (>80V). The second output can be also a lower voltage output and implemented as described in FIG. 12, wherein the second output energizes Ich2 having as reference the voltage in the drain of M1. In such case the value of the second capacitor Caux is larger than the Cbk, 150. One solution is to provide the energy for the current source $Ich_1$ and $Ich_2$ from the energy harvested from the parasitic energy which in most of application is dissipated. Such energy can be harvested from the leakage inductance energy or from the energy contained in the parasitic oscillations which occur during the dead time of the topology used in the DC-DC Converter. In such case, we extract energy which otherwise would be dissipated and use it to improve the overall efficiency of the AC-DC converter. In this embodiment the energy gets injected in the bulk capacitor during the time the DC-DC Converter is extracting its energy directly from the AC line and not from the bulk capacitor. At t2, as depicted in FIG. 11, when M1 turns on the energy will flow from the bulk capacitor which was further charged by $Ich_1$ and $Ich_2$ increasing the medium voltage on the bulk capacitor which according with the graph from FIG. 3 will increase the efficiency of the DC-DC Converter and consequently will increase the efficiency of the entire AC-DC Converter.

Embodiment #4

Figure 13:
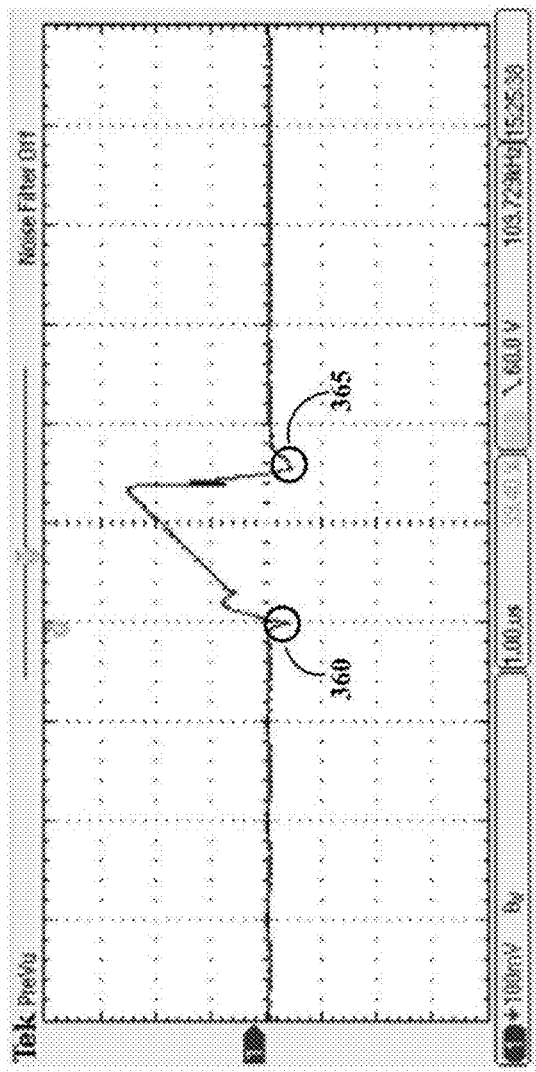
FIG. 13 presents the input current in a flyback topology employing Rompower current injection and Rompower passive clamp technology.
Figure 14:
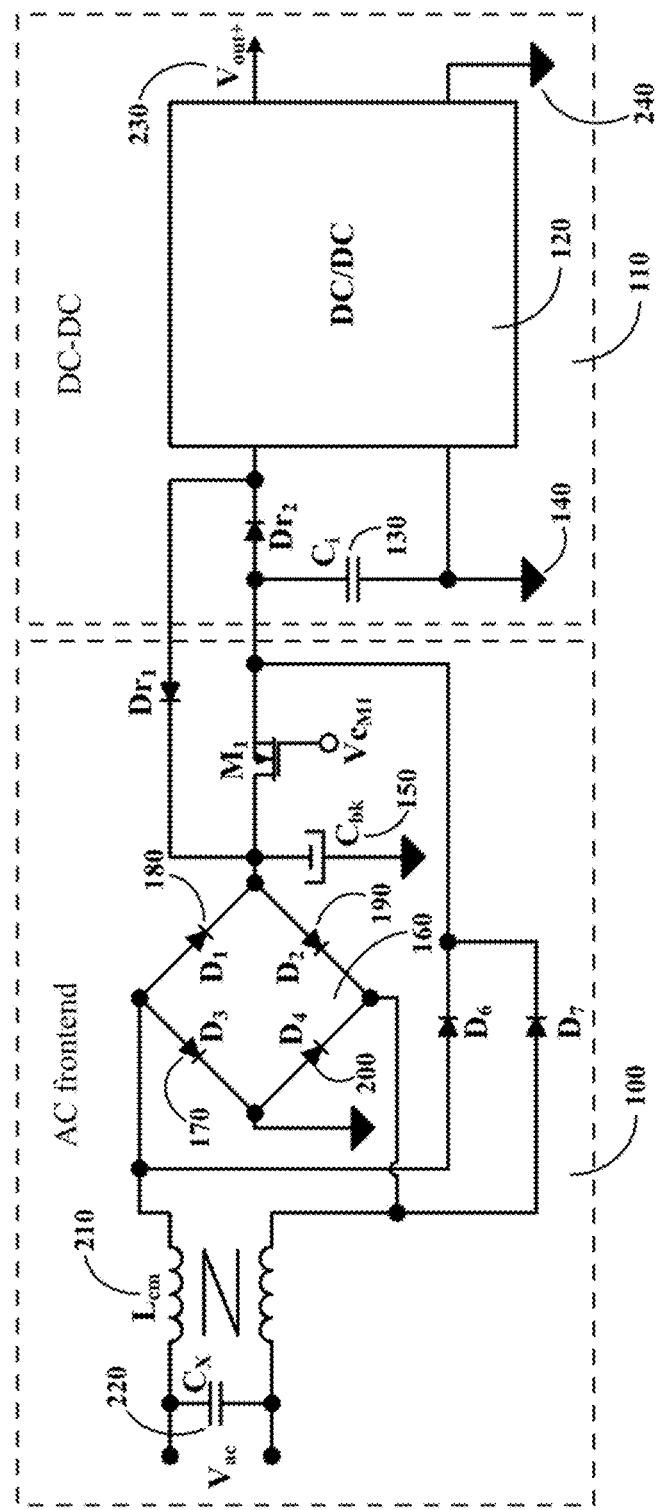
FIG. 14 presents the AC-DC converter using another embodiment of this specification.

The DC-DC Converter can employ different technologies. In application wherein the DC-DC Converter employs Rompower technologies such as U.S. Pat. No. 10,574,148, "Self-Adjusting Current Injection Technology", U.S. Pat. No. 10,972,014, "High Efficiency Passive Clamp", U.S. Pat. No. 10,651,748, "Energy Recovery from the Leakage Inductance of the Transformer", the current through the primary winding of the transformer looks as depicted in FIG. 13. In FIG. 13 the input current in the DC-DC Converter has two sections wherein the current becomes negative, such as 360 and 365. The current 360 and 365 gets out of the DC-DC converter towards the output of the AC frontend 100. The current 360 is generated by the current injection which is designed to discharge the parasitic capacitance across the primary switch and obtain zero voltage switching conditions for the primary switch. The second negative current, 365 is generated by Rompower's active or passive clamp. The negative current 360 and 365 can be used to charge Cbk, 150, in between t1 and t2 via Dr1 as depicted in FIG. 14. The positive current of the input current is delivered through Dr2 from Ci.

In this embodiment there are changes such as the addition of two reciters, Dr1 and Dr2 and the negative sections of the input current is charging Cbk during the time interval δ, increasing the voltage on the bulk capacitor from t1 to t2 and as a result increasing the efficiency of the DC-DC Converter and also the efficiency of AC front end. If the Dr1 and Dr2 are not inserted as depicted in FIG. 9, the negative input current of the DC-DC converter would be injected in Ci, in a form of energy recycling wherein the diode D6 and D7 conduct and are connected to the input voltage source, as a result some of the energy injected by the negative current of the input current will go into the AC input line. In the circuit presented in FIG. 14, the energy contained in the negative current 360 and 365 from FIG. 13, of the DC-DC converter input current is stored in the Cbk and contained in the AC-DC converter, to be further used when M1 is turned on and the energy demanded by the DC-DC Converter will be provided by the energy in the bulk capacitor Cbk, 150. During the time interval between t1 and t2 from FIG. 15, the energy contained in the negative current of the DC-DC Converter input current, 360 and 365, is not sent back to the line is stored in the bulk capacitor Cbk, 150. The disadvantage of this embodiment is the presence of another two rectifiers, Dr1 and Dr2, and the power dissipated in them.

Embodiment #5

Figure 16:
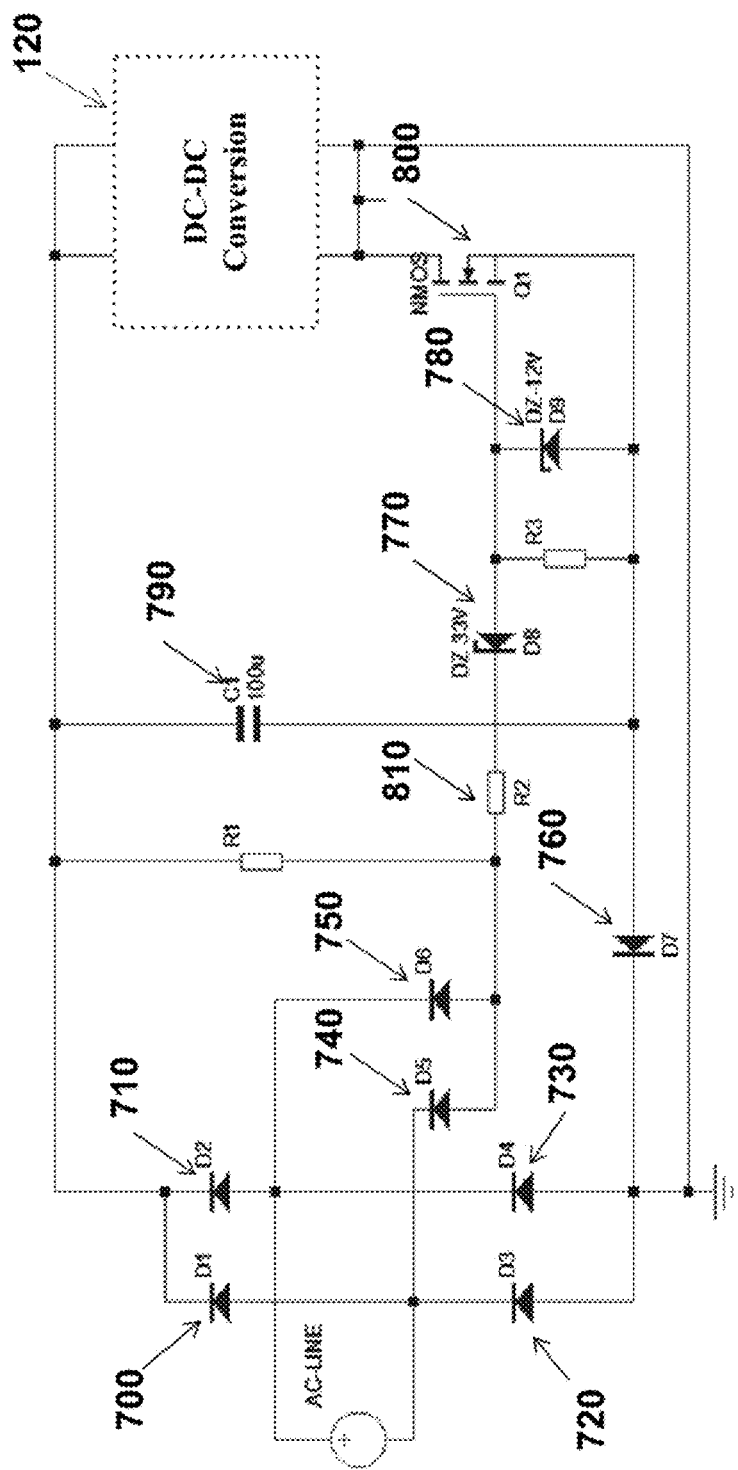
FIG. 16 presents the implementation of the AC-DC converter in one embodiment.

FIG. 16 presents an implementation of Embodiments 1 to 4. After the rectification circuit diodes D1, 700, D2, 710, D3, 720, D4, 730, through diode D7, 760 the capacitor C1, 790 is charged to the peak voltage value of the AC supply. The voltage rectified by diodes D5, 740, D6, 750 and not filtered is applied through R2, 810 and D8, DZ33V, 770 to the gate pin of mosfet Q1, 800. When the rectified voltage of the AC line is lower by 33V (D8 770) than the voltage on C1, 790, the diode opens and opens the transistor Q1, 800. The voltage on the capacitor C1, 790 is applied to the input of the DC-DC converter and takes its supply power. Transistor Q1, 800 is blocked when the voltage on the capacitor is as low as 33V, D8, 770 and the power is taken over by the AC input.

Embodiment #6

Figure 17:
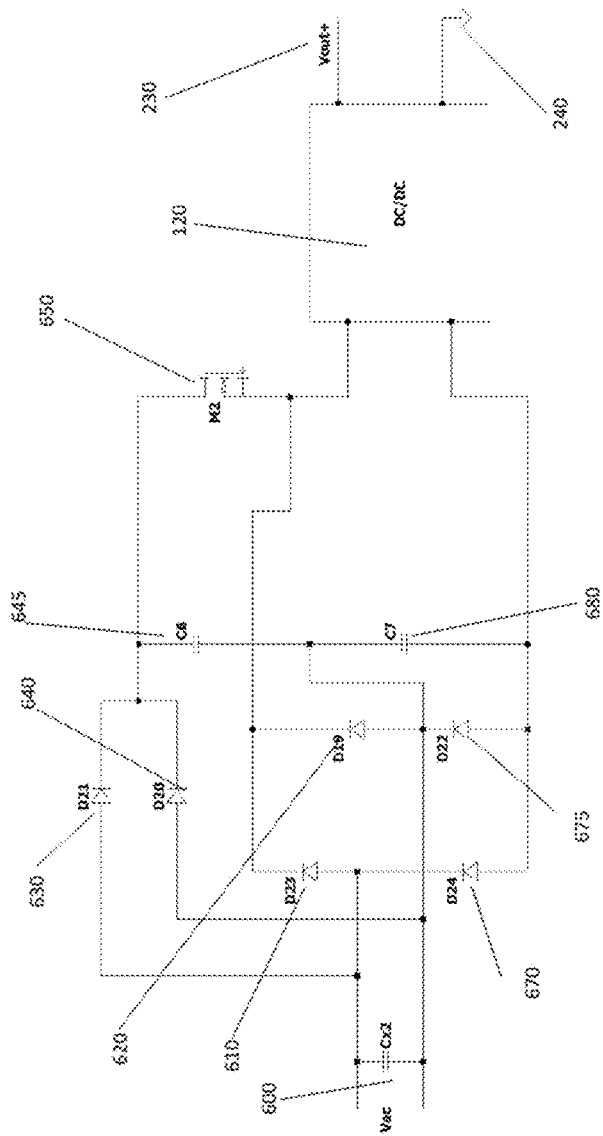
FIG. 17 presents the implementation of the AC-DC converter in one embodiment.

FIG. 17 presents an implementation of the embodiment 6. The DC link concept enables more power to be drawn from the AC line and reduces the converter input voltage ripple. This is accomplished by isolating the high voltage bulk capacitor with a high voltage switch. The DC link voltage doubler has two high voltage capacitors 645 and 680 in series. The peak voltage which is applied to the DC/DC converter 660 is higher than with the standard DC link due to the voltage doubler action. This translates into a higher efficiency of the DC/DC converter due to a higher input voltage operation.

What is claimed is:

1. An AC-DC converter circuit comprising:
a ground connection;
an input AC voltage source having two terminals, said input AC voltage source having a positive peak and a negative peak and reaching zero amplitude in between the positive and negative peaks, which repeats for a large number of cycles;
an input bridge rectifier formed by a left branch and a right branch, each branch formed by two rectifier means in series, having a left branch node which is a common connection of the two rectifier means on the left branch, and having a right branch node which is the common connection of the two rectifier means on the right branch;
wherein the left branch and right branch are connected together at each end, defining an upper end bridge and a lower end bridge;
wherein the upper end bridge and the lower end bridge are connected to each terminal of the input AC voltage source;
wherein the left branch node is connected to the ground connection;
a bulk capacitor connected to the right branch node and the ground connection;
a DC-DC converter having a positive input and a negative input;
an input capacitor connected to the positive and negative inputs, wherein the negative input is also connected to the ground connection;
a control switch connected in between the bulk capacitor to the terminal which is connected to the right branch node and to the positive input of the DC-DC converter;
a first rectifier means connected in between the upper end bridge and the positive input of the DC-DC converter; and
a second rectifier means connected in between the lower end bridge and the positive input of the DC-DC converter.

2. The AC-DC converter circuit of claim 1, wherein:
the bulk capacitor is formed by two totem pole capacitors in series, wherein the two totem pole capacitors are an upper capacitor and a bottom capacitor;
the bottom capacitor is connected to the ground connection with a terminal that is not connected to the upper capacitor; and
a controlled current source is connected in parallel with the upper capacitor.

3. The AC-DC converter circuit of claim 2, wherein the controlled current source is activated during a time when the control switch is off.

4. The AC-DC converter circuit of claim 3, wherein the controlled current source is energized by the DC-DC converter.

5. The AC-DC converter circuit of claim 3, wherein the controlled current source is energized by energy harvested from parasitic energy from the DC-DC converter.

6. The AC-DC converter circuit of claim 1, wherein a controlled current source is connected in parallel with the bulk capacitor.

7. The AC-DC converter circuit of claim 6, wherein the controlled current source is activated during a time when the control switch is off.

8. The AC-DC converter circuit of claim 7, wherein the controlled current source is energized by the DC-DC converter.

9. The AC-DC converter circuit of claim 7, wherein the controlled current source is energized by energy harvested from parasitic energy from the DC-DC converter.

10. A method comprising:
providing an AC-DC converter circuit comprising:
a ground connection;
an input AC voltage source having two terminals, said input AC voltage source having a positive peak and a negative peak and reaching zero amplitude in between the positive and negative peaks, which repeats for a large number of cycles;
an input bridge rectifier formed by a left branch and a right branch, each branch formed by two rectifier means in series, having a left branch node which is a common connection of the two rectifier means on the left branch, and having a right branch node which is the common connection of the two rectifier means on the right branch;
wherein the left branch and right branch are connected together at each end, defining an upper end bridge and a lower end bridge;
wherein the upper end bridge and the lower end bridge are connected to each terminal of the input AC voltage source;
wherein the left branch node is connected to the ground connection;
a bulk capacitor connected to the right branch node and the ground connection;
a DC-DC converter having a positive input and a negative input;
an input capacitor connected to the positive and negative inputs, wherein the negative input is also connected to the ground connection;
a control switch connected in between the bulk capacitor to the terminal which is connected to the right branch node and to the positive input of the DC-DC converter;
a first rectifier means connected in between the upper end bridge and the positive input of the DC-DC converter; and
a second rectifier means connected in between the lower end bridge and the positive input of the DC-DC converter; and
operating the AC-DC converter.

11. The method of claim 10, wherein the control switch is turned off at a time when the input AC voltage source reaches its positive and negative peak and turns on after a determined time period.

12. The method of claim 11, wherein the determined time period is tailored so that AC-DC converter efficiency is maximized.

13. The method of claim 10, wherein:
the bulk capacitor is formed by two totem pole capacitors in series, wherein the two totem pole capacitors are an upper capacitor and a bottom capacitor;
the bottom capacitor is connected to the ground connection with a terminal that is not connected to the upper capacitor; and
a controlled current source is connected in parallel with the upper capacitor.

14. The method of claim 13, wherein the controlled current source is activated during a time when the control switch is off.

15. The method of claim 10, wherein the control switch is turned off at a time when the input AC voltage source reaches its positive and negative peak and turns on after a determined time period.

16. The method of claim 15, wherein the determined time period is tailored so that AC-DC converter efficiency is maximized.

17. The method of claim 10, wherein a controlled current source is connected in parallel with the bulk capacitor.

18. The method of claim 17, wherein the controlled current source is activated during a time when the control switch is off.

* * * * *